(12) United States Patent
Ai et al.

(10) Patent No.: US 6,595,884 B1
(45) Date of Patent: Jul. 22, 2003

(54) CONTINUOUS VARIABLE TRANSMISSION

(75) Inventors: Xiaolan Ai, Massillon, OH (US); Terry W. Mohr, Canton, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 09/721,110

(22) Filed: Nov. 22, 2000

(51) Int. Cl.$^7$ .................................................. F16H 3/72
(52) U.S. Cl. ........................................ 475/5; 475/151
(58) Field of Search ........................... 475/5, 72, 149, 475/151; 180/65.2, 65.4

(56) References Cited

U.S. PATENT DOCUMENTS

| | | | |
|---|---|---|---|
| 3,699,351 A | | 10/1972 | Addie |
| 3,861,484 A | * | 1/1975 | Joslin ........................ 180/65.2 |
| 4,519,272 A | | 5/1985 | Meier |
| 4,825,721 A | | 5/1989 | Gabriele |
| 5,558,588 A | | 9/1996 | Schmidt |
| 5,558,589 A | | 9/1996 | Schmidt |
| 5,571,058 A | | 11/1996 | Schmidt |
| 5,577,973 A | * | 11/1996 | Schmidt ..................... 180/65.2 |
| 5,730,676 A | | 3/1998 | Schmidt |
| 5,800,302 A | * | 9/1998 | Werre ............................. 475/1 |
| 5,947,854 A | | 9/1999 | Kopko |
| 5,980,410 A | | 11/1999 | Stemler et al. |
| 6,095,640 A | | 8/2000 | Ai et al. |

FOREIGN PATENT DOCUMENTS

GB 1379213 * 2/1975

* cited by examiner

Primary Examiner—Ankur Parekh
(74) Attorney, Agent, or Firm—Polster, Lieder, Woodruff & Lucchesi, L.C.

(57) ABSTRACT

A continuously variable transmission has two planetary units organized about a common axis, with each unit including a sun member, a ring member, planet elements located between the sun and ring members, and carrier members providing axes about which the planet elements rotate. The two units are connected mechanically and through two variators, each of which preferably takes the form of a motor-generator. The arrangement creates two paths for transferring power from an input shaft to an output shaft—one path being a planetary path and the other a variator path. When power transfers through the variator path, one variator functions as a generator and the other as a motor. Between the two variators is a control unit which controls the amount of power transferred through the variator path.

21 Claims, 7 Drawing Sheets

CONTINUOUS VARIABLE TRANSMISSION

BACKGROUND OF THE INVENTION

The present invention relates in general to transmissions and more particularly to a continuously variable speed transmission that employs a power split.

Transmissions have been widely used to regulate speed and torque while keeping engines or prime movers running at desired speeds and torque usually within a narrow range. Speed and torque regulations can be achieved either by largely mechanical means or, alternatively, by electrical motor-generators and associated controls.

There are basically two major types of mechanical transmissions in use today: stepwise transmissions, such as conventional manual and automatic transmissions, and stepless transmissions or CVTs (continuous variable transmissions), such as belt CVTs and toroidal CVTs.

Stepwise transmissions, using multiple gear sets and clutching devices, are quite popular. However, they have the disadvantage of torque interruption while changing gears. Optimization of engine performance for improved fuel economy or pollution reduction often requires an increasing number of gear sets and complex clutching mechanisms. This adds to the cost, complexity and parasitic power loss within such transmissions and reduces their overall efficiency.

CVTs overcome the torque interruption and speed jump problems, and can provide continuously variable output speed while keeping the input speed constant. CVTs are usually more mechanically efficient tin stepwise transmissions. But in general, CVTs are more complex in construction and require a sophisticated controlling system. Most CVTs are not rugged enough for handling torque of large magnitudes due to practical design limitations on the size of the contact footprint of friction surfaces in such transmissions. In addition, the speed variation range is somewhat limited.

Using a direct electric drive has the benefit of providing continuously variable output speed, and can achieve wide speed variation range. Such systems are appealing from a construction point of view. However, direct electric drives tend to be more costly, as they also require a generator to convert the mechanical energy to electrical energy. Since the generator and motor are in a series link with the engine and driving wheels, large motors and generators, capable of providing maximum rated power, must be used. In direct electric drives, energy is converted at lest twice between mechanical and electrical forms. Energy is lost in these conversions. Today, direct electric drives are, at best, 80% efficient.

Therefore, a need exists for a transmission capable of offering smooth and wide speed variation and yet having a high overall efficiency.

SUMMARY OF THE INVENTION

The present invention resides in a transmission including two planetary units organized about a common axis, with each including a sun member, a ring member surrounding like sun member, planet elements located between and contacting the sun and ring members, and a carrier member providing axes about which the planet elements rotate. Two members of the two planetary units are connected to external couplers through which power is introduced into and delivered from the transmission. The members of the two units are connected such that a planetary path extends between the external couplers, it being purely mechanical. Two of the members are connected to variators which themselves may be connected together to provide a secondary path through the transmission, and that path is characterized by the ability to vary speed and torque to the members connected to the variators.

DETAILED DESCRIPTION

Figure 1:
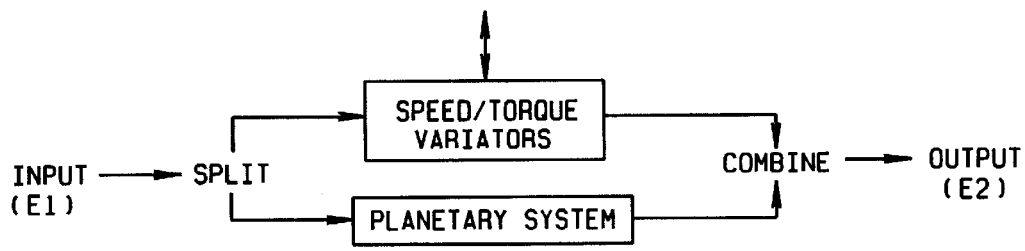
FIG. 1 is a block diagram illustrating the two paths (planetary and variator) through which power is transmitted through the transmission of the present invention.
Figure 2:
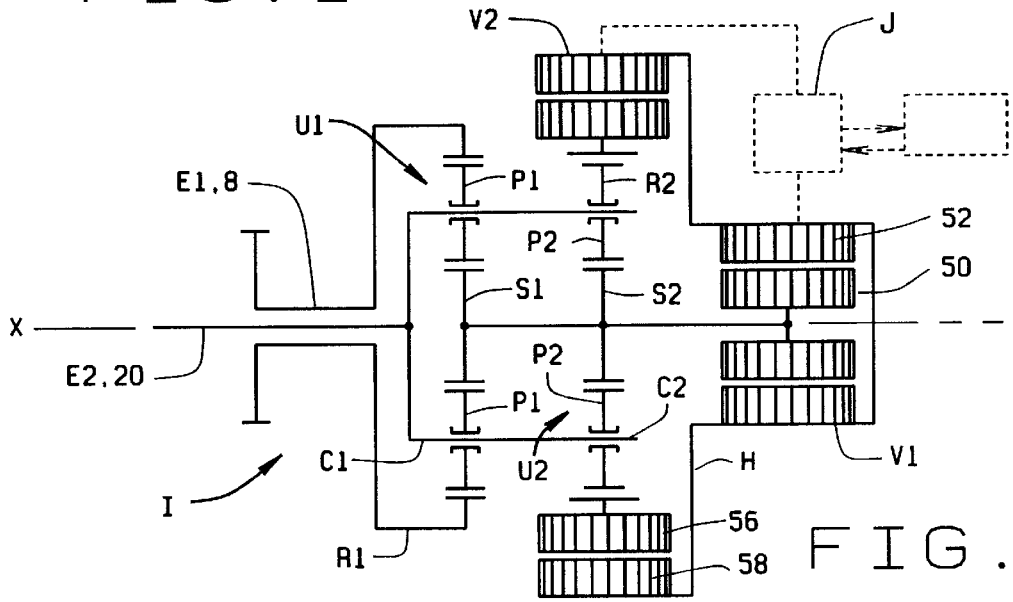
FIG. 2 is a schematic drawing of a variant of one configuration of the transmission.
Figure 3:
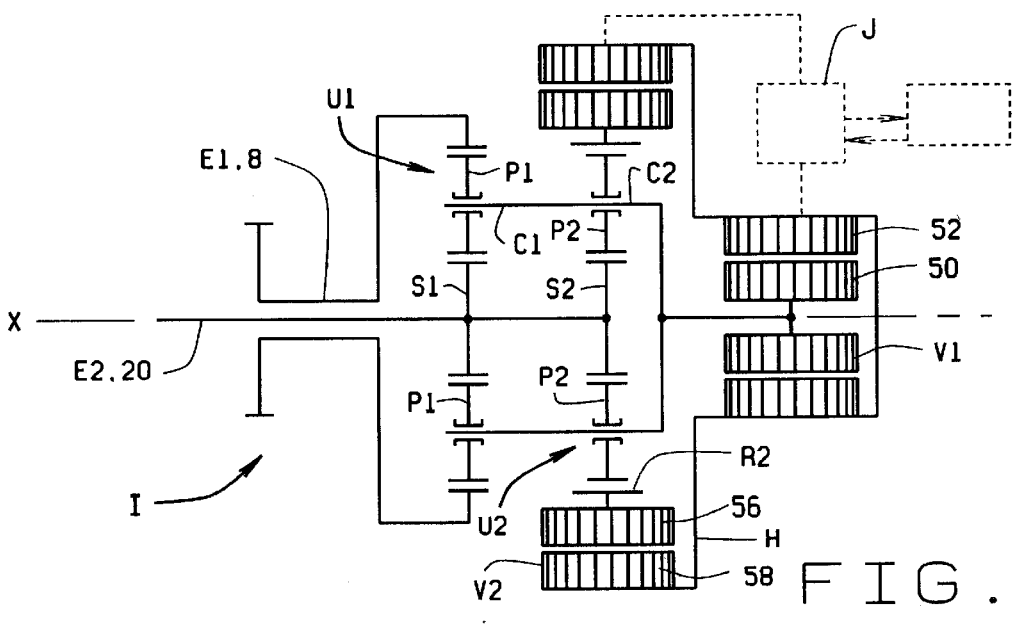
FIG. 3 is a schematic drawing of another variant of the configuration illustrated in FIG. 2.
Figure 4:
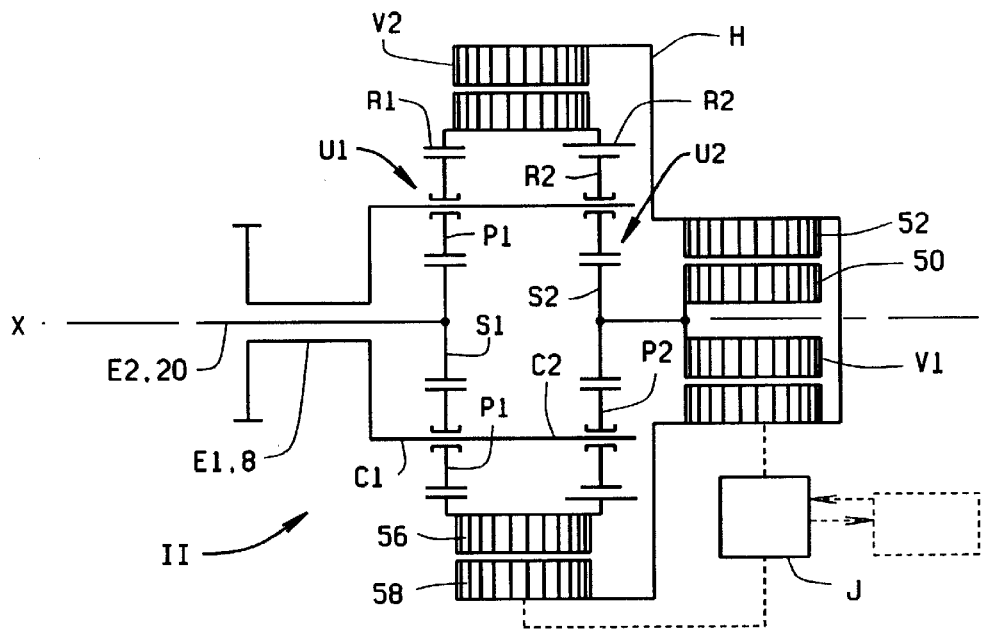
FIG. 4 is a schematic drawing of a variant of another configuration of the transmission.
Figure 5:
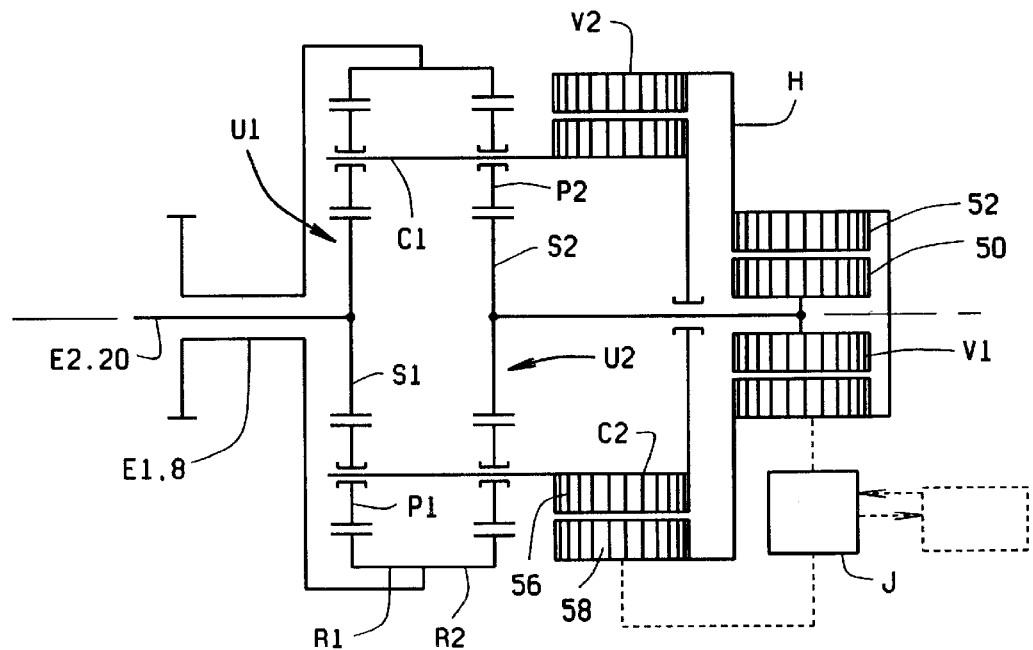
FIG. 5 is a schematic drawing of another variant of the configuration illustrated in FIG. 4.

A transmission which operates at variable speed ratios has two paths (FIG. 1) for transferring power through it from one external coupler E1 to another external coupler E2—typically from an input shaft to an output shaft. The first or planetary path transfers the power through purely mechanical connections. The second or variator path transfers power through connections which have the capacity to vary speed ratios between coupled components. The planetary path is usually the more efficient and is capable of transmitting higher levels of torque and power. The variator path, while usually transferring lower levels of torque and power, controls the speed ratio of the transmission, and in that sense is the active path. The transmission may assume any one of several basic configurations I, II and III, and each configuration in turn has its variants (FIGS. 2–5).

Irrespective of the configuration I, II or III, the transmission has two planetary sets or units U1 and U2, which are organized along a common axis X and form the first or planetary path and segments of the second or variator path. In addition it has two variators V1 and V2 which form the remainder of the variator path. Finally, the transmission has a base, typically in the form of a housing H, on which the planetary units U1 and U2 and variators V1 and V2 are mounted. Each planetary unit U1 and U2 includes four basic components, namely a sun member S, a ring member R which encircles the sun member S, yet shares the same axis which is the axis X, several planet elements P which are located between the sun member S and ring member R and roll along both, and a carrier member C which provides axes around which the planet elements P revolve and thus maintains a prescribed angular relationship between the planet elements P. In the configuration I (FIGS. 2 and 3) the two sun members S are joined together such that they cannot rotate relative to each, as are the carrier members C, whereas the ring members R are separated and rotate at different velocities. In the configuration II (FIGS. 4 and 5) the two ring members R are connected such that they cannot rotate, as are the carrier members C, whereas the sun members S rotate relative to each other. In the configuration III (not illustrated), the two sun members S are united as are the two ring members R, but the carrier members C are detached so that they can rotate relative to each other. Thus, each configuration I, II and III has three sets of corresponding members. The members in two of the sets are united, whereas the members in the remaining set are detached. The detached members become differential members because they can rotate at different angular velocities. The united members of a set are connected, and if they rotate, they rotate at the same angular velocity.

The variators V1 and V2 are connected between the housing H and one of the differential members of the detached set and between the housing H and one of the sets of united members. They accommodate relative rotation between the members to which they are connected and the housing H. One external coupler E or shaft is connected to the other differential member, whereas the other external coupler E or shaft is connected to the set of united members that is not connected to one of the variators V1 or V2.

Irrespective of its configuration I, II or III, the transmission provides four concentric motions about the axis X. One of the motions is represented by one set of united members, another by the other set of united members, and the remaining two by the differential members of the remaining set.

In the configuration I (FIGS. 2 & 3), the four concentric motions are represented by:
1. the united carrier members C
2. the united sun members S
3. the differential ring member R for the unit U1
4. the differential ring member R for the unit U2.

The external coupler E1 is connected to the differential ring member R for the unit U1, whereas the variator V2 is connected to the differential ring member R for the unit U2. In one variant (FIG. 2) of the configuration I, the other external coupler E2 is connected to the united carrier members C, whereas the variator V1 is connected to the united sun members S. In another variant (FIG. 3), the reverse holds true, that is, the variator V1 is connected to the united carrier members C, whereas the external coupler E2 is connected to the united sun members S.

In the configuration II (FIGS. 4 & 5), the four concentric motions are represented by:
1. the united carrier members C
2. the united ring members R
3. the differential sun members S of the unit U1
4. the differential sun member S of the unit U2.

The external coupler E2 is connected to the differential sun member S of the unit U1 and the variator V1 is connected to the differential sun member S of the unit U2. In one variant (FIG. 4) of the configuration II, the external coupler E1 is connected to the united carrier members C and the variator V2 to the united ring members R. In another variant, (FIG. 5), the external coupler E1 is connected to the united ring members R and the variator V2 to the united carrier members C.

The variators V1 and V2 have the capacity to extract power from or deliver it to those components of the planetary units U2 and U2 to which they are coupled. The arrangement is such that the power that is extracted at the variator V1 is delivered to the variator V2 or vice versa, in which event the power is kept entirely within the transmission. Then again, some of the power extracted at one of the variators V1 or V2 may be delivered to an external source, so that not all of the power that is supplied at the powered external coupler E is delivered to the driven external coupler E. On the other hand, one of the variators V1 or V2 may receive power from an external source, so that the power delivered at the driven coupler E may exceed the power supplied at the powered external coupler E. The variators V1 and V2 preferably take the form of electric motor-generators, but they may also take the form of hydraulic pump-motors. They may even assume a purely mechanical configuration, for example, belts which operate over pulleys with controllable diameters, thus providing varying speed ratios between the members to which they are connected.

Within the transmission, irrespective of the configuration, a purely planetary path exists for transferring power between the two external couplers E. The variators V1 and V2, however, provide a secondary or variator path through which power is also transferred. The transfer of power may occur entirely though the planetary path or simultaneously through the planetary path and the variator path. The variator path gives the transmission the capacity to vary the speed ratio between the external coupler E1 and E2—indeed, to render the speed ratio infinitely variable and controllable within a defined speed range.

The transmission, irrespective of its configuration I, II and III, operates most efficiently when transmitting all of the power through its planetary path, inasmuch as planetary path transmits power at near 100 percent efficiency. The variator path usually is less efficient or less capable of transmitting torque of large magnitudes or both. The transmission has two node points where all the power transferred passes through its planetary path, assuming that no power is introduced into or extracted from the variator path. Where the input speed remains constant, the ratio $\phi$ between the output speeds at the two node points constitutes the nominal speed range ratio for the transmission. The two planetary units U1 and U2, while having corresponding members, have different geometries in those members and the amount of variance in the geometries determines the nominal speed range ratio $\phi$. For a passenger car, a nominal speed range ratio $\phi$ on the order of 4:1 might suffice, but for a truck or heavy construction equipment, it may be as high as 18:1 to 25:1.

The planetary elements P of units U1 or U2 may contact the sun members S and ring members R of the units U1 and U2 along friction surfaces that may be tapered or cylindrical. If tapered, they should run on apex, meaning that the envelopes formed by the conical surfaces of the planetary elements P for the unit U1 have their apices at a common point along the axis X as do the conical envelopes formed by the tapered surfaces of the sun member S and ring members R for the unit U1 This produces pure rolling contact, that is to say, contact that is characterized by the absence of spinning. On the other hand, the planetary members P of a unit U1 or U2 may engage the sun member S and ring member R of the unit with meshing gear teeth.

The nominal speed range ratio $\phi$ for either any of the configurations I, II or III of the transmission is inversely proportional to the difference between the speed ratios of its two planetary sets U1 and U2, that is to say, it may be expressed by the formula:

$$\phi = \frac{C}{K1 - K2}$$

where
C is a constant
K1 is the speed ratio for the unit U1
K2 is the speed ratio for the unit U2

Actually, K1 and K2 are the so-called K factors for the planetary units U1 and U2, respectively. Where the unit U1 or U2 relies on contacting cylindrical surfaces, the K factor is the diameter of the cylindrical surface on the ring member R divided by the diameter of the cylindrical surface on the sun member S. Similarly, where the unit U1 or U2 utilizes meshing gears, the K factor is the pitch circle diameter of the ring member R divided by the pitch circle diameter of the sun member S. On the other hand, where the unit U1 and U2 relies on tapered surfaces, the K factor is the sine of the half-angle formed by the tapered surface of the ring member R divided by the sine of the half-angle formed by the tapered surface of the sun member S.

For the configuration I, the nominal speed range ratio is $$\phi = \frac{K1 + 1}{K1 - K2}$$

For the configuration II, the nominal speed range ratio is $$\phi = \frac{K1(K2 + 1)}{K1 - K2}$$

Since the difference between the K factors K1 and K2 for the two units U1 and U2 forms the denominator for the formula for ascertaining the speed range ratio φ large speed range ratios are achieved by making the difference between the K factors, that is between the speed ratios of the two units U1 and U2, small.

When no power is extracted from or delivered to the transmission at the variator path, that is when the power P is supplied entirely at the external coupler E that is attached to a prime mover, the maximum power $P_{variator}$ that passes through the variator path when the transmission operates between its node points is:

$$P_{variator} = \frac{\sqrt{\phi} - 1}{\sqrt{\phi} + 1} P$$

Figure 6:
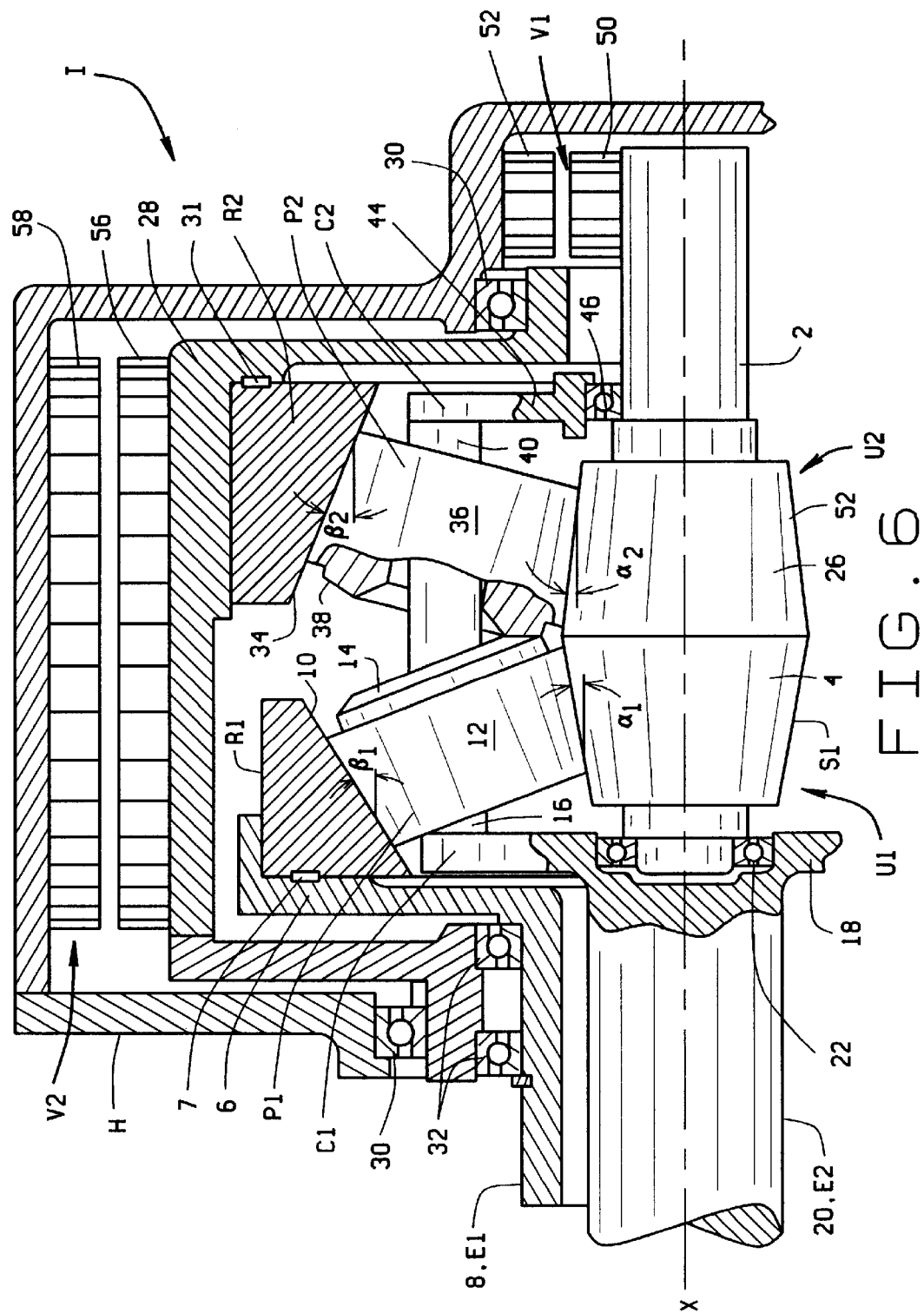
FIG. 6 is a half-sectional view in elevation of the configuration and variant illustrated schematically in FIG. 2.

Considering one variant of the configuration I in more detail, a variant (FIG. 2) with tapered rollers for the planetary elements P (FIG. 6), its two planetary units U1 and U2 and its variators V1 and V2 are all contained within the housing H. The sun member S1 of its planetary unit U1 is mounted firmly on an internal center shaft 2 which rotates about the axis X. The sun member S1 has a conical surface 4 which is presented outwardly away from the axis X and lies at an angle $\alpha_1$, with respect to the axis X, its own axis coinciding with the axis X.

The ring member R1 for the planetary unit U1 is fitted firmly to a flange 6 on a tubular shaft 8 which forms the external coupler E1. The flange 6 and ring member R1 for all intents and purposes rotate together, but even so, between the flange 6 and the back of the ring member R1 are ramping rollers 7 to urge the ring member R1 away from the flange 6. The ring member R1 has a conical surface 10 that is presented inwardly toward the conical surface 4 of the sun member S1 and lies at an angle $\beta_1$ with respect to the axis X, its own axis likewise coinciding with the axis X. The envelopes formed by the conical surface 4 of the sun member S1 and the envelope formed by the conical surface 10 of the ring member R1 have their respective apices at a common point along the axis X.

The planet elements P1 for the unit U1 lie between the sun member S1 and ring member R1 at equal angular intervals and have conical side faces 12 which contact the conical surfaces 4 and 10 of the sun member S1 and ring member R1, respectively. Each planet element P1 has a hollow interior and a beveled end face 14 located beyond the large end of its conical side face 12.

The carrier C1 of the unit U1 has several axles 16 which project from a flange 18 located opposite the small ends of the planet elements P1. The flange 18, in turn, merges into an external center shaft 20 that rotates about the axis X. The external center shaft 20 is fitted with a bearing 22 in which one end of the internal center shaft 2 rotates. The shaft 20 projects out of the housing H through the hollow interior of the tubular shaft 8 and forms the other external coupler E2 of the transmission A. The axles 16 are arranged at equal circumferential intervals, and each extends into the hollow interior of a different planet element P1 where it is fitted with a bearing to enable its planet member P1 to rotate on it. U.S. patent application Ser. No. 09/627,675 for the invention of Xiaolan Ai entitled Planetary Traction Drive Transmission shows bearings suitable for enabling the planet elements P1 to rotate on their axles 16.

The speed ratio K1, that is the K factor, for the planetary unit U1 is $$K1 = \frac{\sin\beta_1}{\sin\alpha_1}$$

Turning now to the planetary unit U2, its sun member S2 is likewise mounted on the internal center shaft 2 such that it cannot rotate relative to the sun member S1. It has a conical surface 26 that is presented outwardly at an angle $\alpha_2$ with respect to the axis, and its axis also coincides with the axis X. The conical surface 26 of the sun member S2 tapers downwardly away from the conical surface 4 of the sun member S1 so that the two conical surfaces 4 and 26 are closest at their large ends.

The ring member R2 of the unit U2 is contained within a drum 28 that rotates within the housing H on bearings 30 that are between its ends and the housing H. The ring member R2 and drum 28 for all intents and purposes rotate together, but between the back of the ring member R2 and one end of the drum 28 are ramping rollers 31 to urge the ring member R2 toward the ring member R1. The two shafts 8 and 20 project through one end of the drum 28, and here the drum 28 is fitted with more bearings 32 within which the tubular shaft 8 rotates. The ring member R2 has a conical surface 34 that is presented inwardly toward the conical surface 26 of the sun member S2 at an angle $\beta_2$ with respect to the axis X, and its axis likewise coincides with the axis X. The conical envelopes formed by the two surfaces 26 and 34 have their apices at a common point along the axis X.

The planet elements P2 of the unit U2 have conical side faces 36 along which they contact the conical surfaces 26 and 34 of the sun member S2 and ring member R2, there being line contact between the side faces 36 and the conical surfaces 26 and 34. Moreover, each planet element P2 has a hollow interior, and beyond the large end of its side face 36 it has a beveled end face 38.

The carrier C2 for the planetary unit U2 has axles 40 which project into the hollow interiors of the planetary elements P2 and are fitted with bearings, so that the planet elements P2 rotate on the axles 40. The carrier C2 also has an end plate 44 which surrounds the internal center shaft 2 beyond the small end of the conical surface 26 on the sun member S2. Here the end plate 44 and shaft 2 are fitted with a bearing 46 which enables one to rotate relative to the other.

The speed ratio K2, that is the K factor, for the planetary unit U2 is $$K2 = \frac{\sin\beta_2}{\sin\alpha_2}$$

Each axle 40 of the carrier C2 for the planetary unit U2 is joined to a corresponding axle 16 of the carrier C1 for the planetary unit U1, and this has the effect of unifying the two carriers C1 and C2. It also organizes the planet elements P1 and P2 for the two units U1 and U2 into sets, there being within each set a planet member P1 and a planet element P2 which contact each other at their respective beveled end faces 14 and 38. The line of contact between the end faces 14 and 38 should lie along a line that connects the intersection of the envelopes for the conical surfaces 4 and 26 on the sun members S1 and S2 and the intersection of the axes for the two planet elements P1 and P2. When the line of contact is so oriented, pure rolling contact exists between the end faces of the two planet elements P1 and P2 of any set. Pure rolling contact also exists between the side faces 12 of the planet elements P1 and the conical surfaces 4 and 10 on the sun member S1 and ring member R1, respectively, along which they roll, since all of those conical surfaces have their apices at a common point along the axis X. The same holds true with regard to the planet elements P2. Pure rolling contact exists between their side faces 36 and the conical surfaces 26 and 34 of the sun member S2 and the ring member R2, respectively.

The housing H surrounds the drum 28 and the planetary units U1 and U2 within it. At one end the housing H projects axially over of the internal center shaft 2, here the variator V1 is located. It takes the form of an electrical motor-generator that includes a rotor 50 on the center shaft 2 and a stator 52 fitted to the housing H.

The housing H has an axially directed wall which surrounds the drum 28 to which the ring member R2 is fitted. The variator V2 lies in the annular space between the axially directed wall of the housing H and the drum 28. It too is an electrical motor-generator, and includes a rotor 56 on the drum 28 and a stator 58 on the housing H.

The variators V1 and V2 are connected electrically through a control unit J (FIG. 2) which has the capacity to control the amount of power transferred between the two variators V1 and V2. As such, the control unit J determines the amount of power transferred in the secondary or variator path. In many installations the control unit J will do nothing more, but in some installations it may extract power from the transmission configuration I and supply to some other equipment, such as a storage battery, or it may introduce power into transmission configuration I, from an external source, such as a storage battery or an auxiliary generator.

In the operation of the transmission of configuration I, first variant (FIG. 2), irrespective of whether its planetary elements P are tapered rollers, cylindrical rollers or gears, a prime mover, such as an internal combustion engine, is coupled to the shaft 8 on which the ring member R1 of the planetary unit U1 is mounted. The shaft 20 to which the two carrier members C are connected is coupled to a driven device which consumes energy and thus requires power—and torque—to rotate it. Preferably, the prime mover operates at a uniform angular velocity—one which achieves optimum efficiency from the prime mover. The transmission of configuration I varies the angular velocity at which the shaft 8 delivers power to the driven device. Thus, as the tubular shaft 8 rotates, it turns the ring member R1 of the planetary unit U1, causing the planet elements P1 to orbit the sun member S1. The planet elements P1 as they orbit, rotate the carrier members C1 and C2, which being connected to the end shaft 20, rotate that shaft 20 which in turn rotates the driven device. But the angular velocities of the carrier members C1 and C2 and the end shaft 20 depend on the angular velocity of the two sun members S1 and S2 and the angular velocity of the ring member R2 of the unit U2. The sun members S1 and S2 rotate with the center shaft 2 which is connected to the variator V1. The ring member R2, on the other hand, is fitted to the drum 28 which in turn is connected to the variator V2. Sometimes the variator V1 operates against a resistance, in which event it functions as a generator, whereas the variator V2 functions as a motor and imparts rotation to the drum 28 and the ring R2 attached to it. At other times the variator V2 functions as a generator and the variator V1 as the motor. At two speeds for the shaft 20 the variators V1 and V2 neither produce nor consume power, and those speeds are at the node points.

Figure 8:
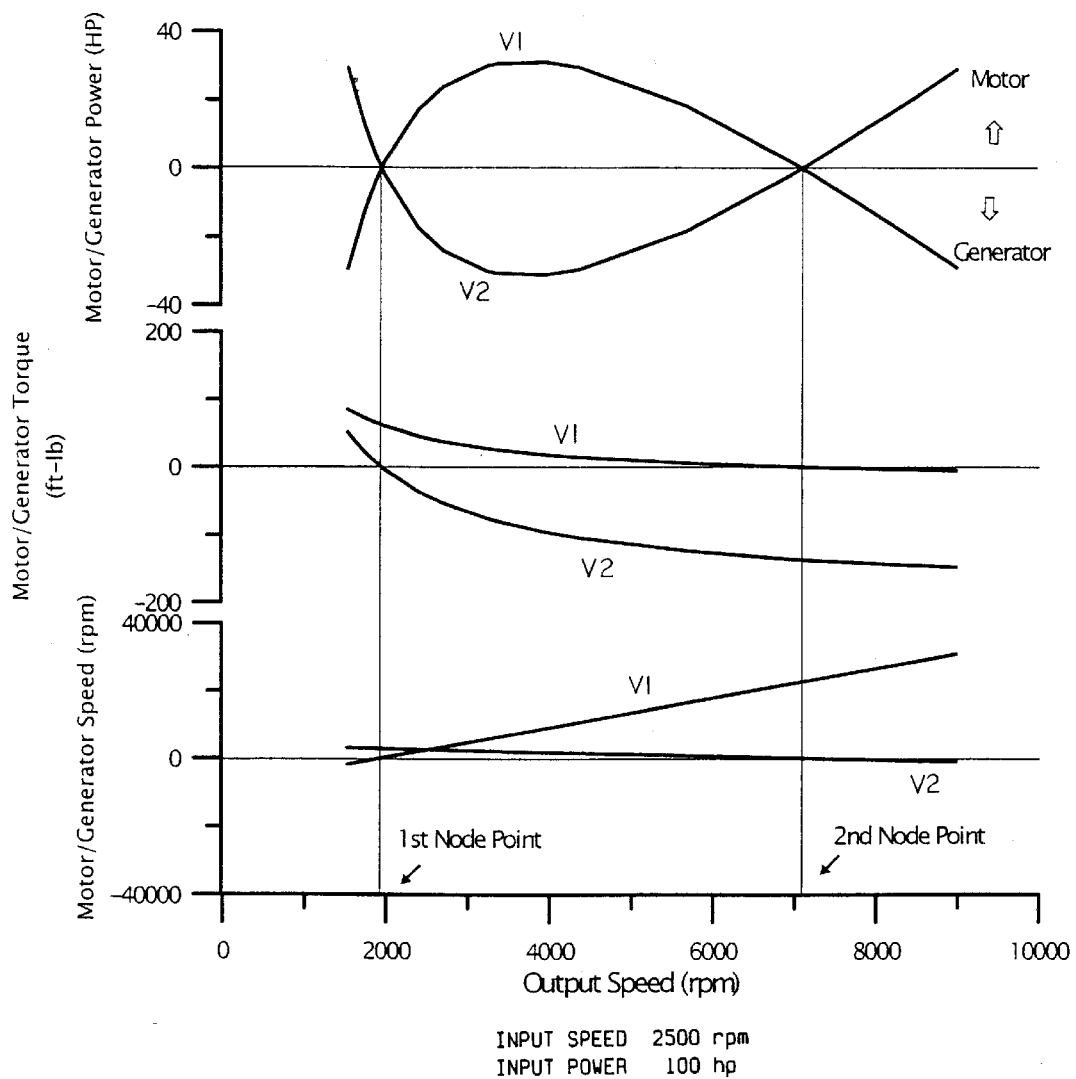
FIG. 8 is a graph comparing output speed with variator power, variator torque, and variator speed for the configuration of FIG. 4 when power is neither extracted from nor introduced into the variator path.

The operation of the transmissions in its configuration I, first variant (FIG. 2), again irrespective of whether its planetary elements P are tapered rollers, cylindrical rollers or gears, is perhaps best explained graphically by comparing the external output speed at the external center shaft 20 with the power produced and consumed by the two variators V1 and V2, also with the torque transmitted through the variators V1 and V2, and further with angular velocities between the variators V1 and V2 and the housing H (FIG. 8). The comparisons assume that the prime mover rotates the tubular input shaft 8 at a constant velocity.

At low velocities for the output shaft 20—velocities below the first node point—the variator V1 resists rotation and acts as the generator, producing electrical energy, the amount of which remains under the control of the control unit J. The variator V2 consumes this energy and rotates the ring member R2. The rotor 50 for the variator V1 revolves in one direction and the rotor 56 for the variator V2 revolves in the opposite direction at a greater angular velocity. The torque exerted on the rotor 50 of the variator V1 exceeds the torque applied to the rotor 56 of the variator V2 and the torques are in the same directions.

At the speed of the output shaft 20 represented by the first node point the variator V1 neither produces any power nor consumes any power and the same hold true for the variator V2. The rotor 50 of the variator V1 comes to rest, but torque is exerted on the rotor 50 to insure that it remains at rest. The rotor 56 of the variator V2 and likewise the ring R2 has no torque exerted on it, but it revolves, free wheeling so to speak.

At speeds of the output shaft 20 between the first node point and the second node point, the variator V2 functions as the generator and the variator V1 as the motor. Thus, the rotor 56 of the variator V2 revolves against a resistance, so the revolving ring R2 exerts torque on it, whereas the stator 52 of the variator V1 exerts torque on the rotor 50 of the variator V1. The torques are in opposite directions.

At the speed of the output shaft 20 represented by the second node point both variators V1 and V2 neither produce power nor consume power. Here the rotor 56 of the variator V2 has torque imposed on it to keep it from rotating, whereas no torque is exerted on the rotor 50 of the variator V1, and it free wheels along with the two sun members S1 and S2 to which it is connected through the internal center shaft 2.

At speeds of the output shaft 20 beyond the second node point the variator V1 again becomes the generator and the variator V2 the motor. Moreover, the rotor 56 of the variator V2 changes direction in rotation and revolves at considerably less velocity than the rotor 50 of the variator V1.

Since all of the power passes through the planetary path at the two node points, the transmission of configuration I operates with its maximum efficiency at the node points. Between and beyond the node points, it is desirable to send most of the power through the planetary path.

Figure 9:
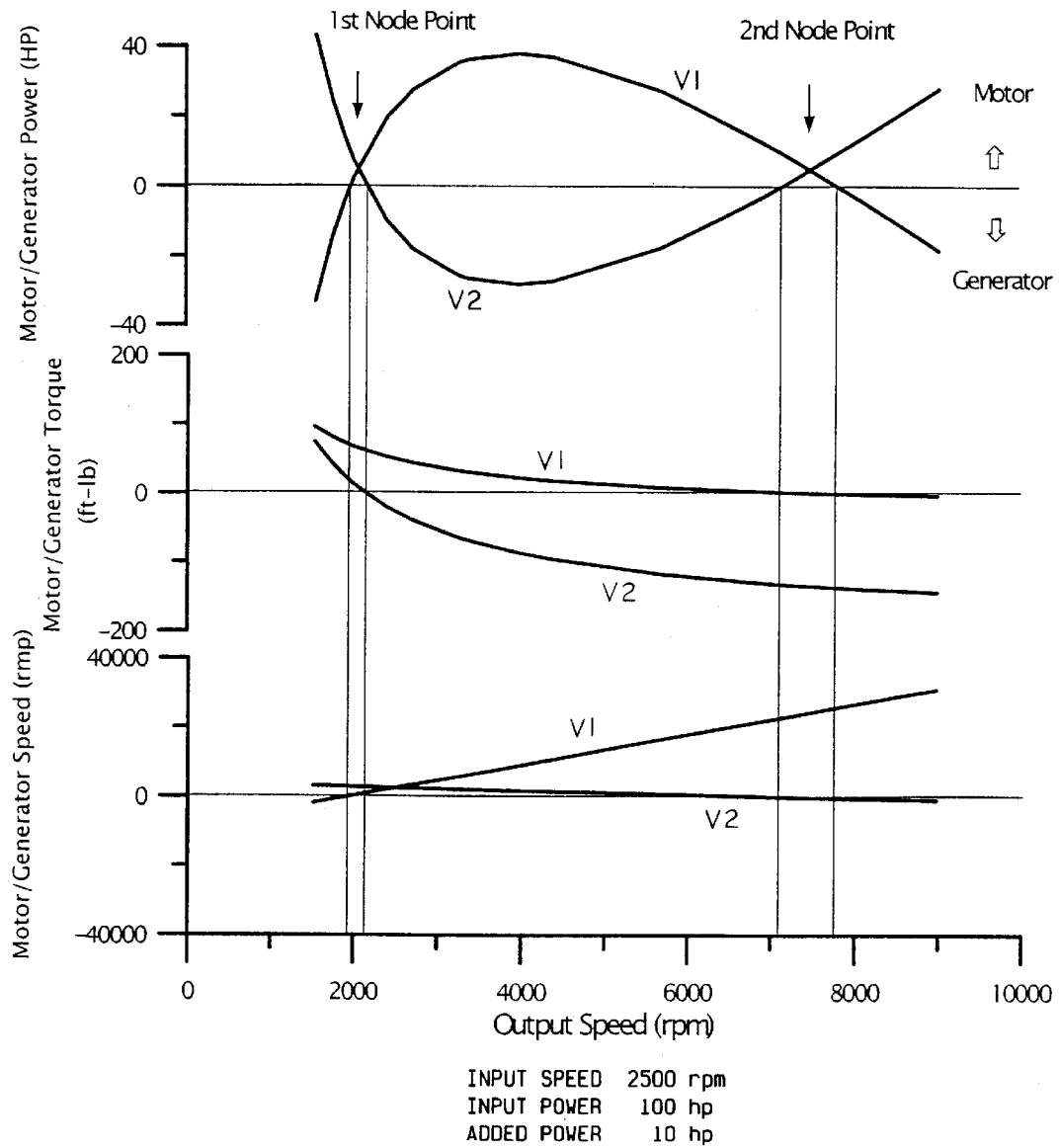
FIG. 9 is a graph comparing output speed with variator power, variator torque, and variator speed for the configuration of FIG. 4 when power is introduced into the variator path from an external source.
Figure 10:
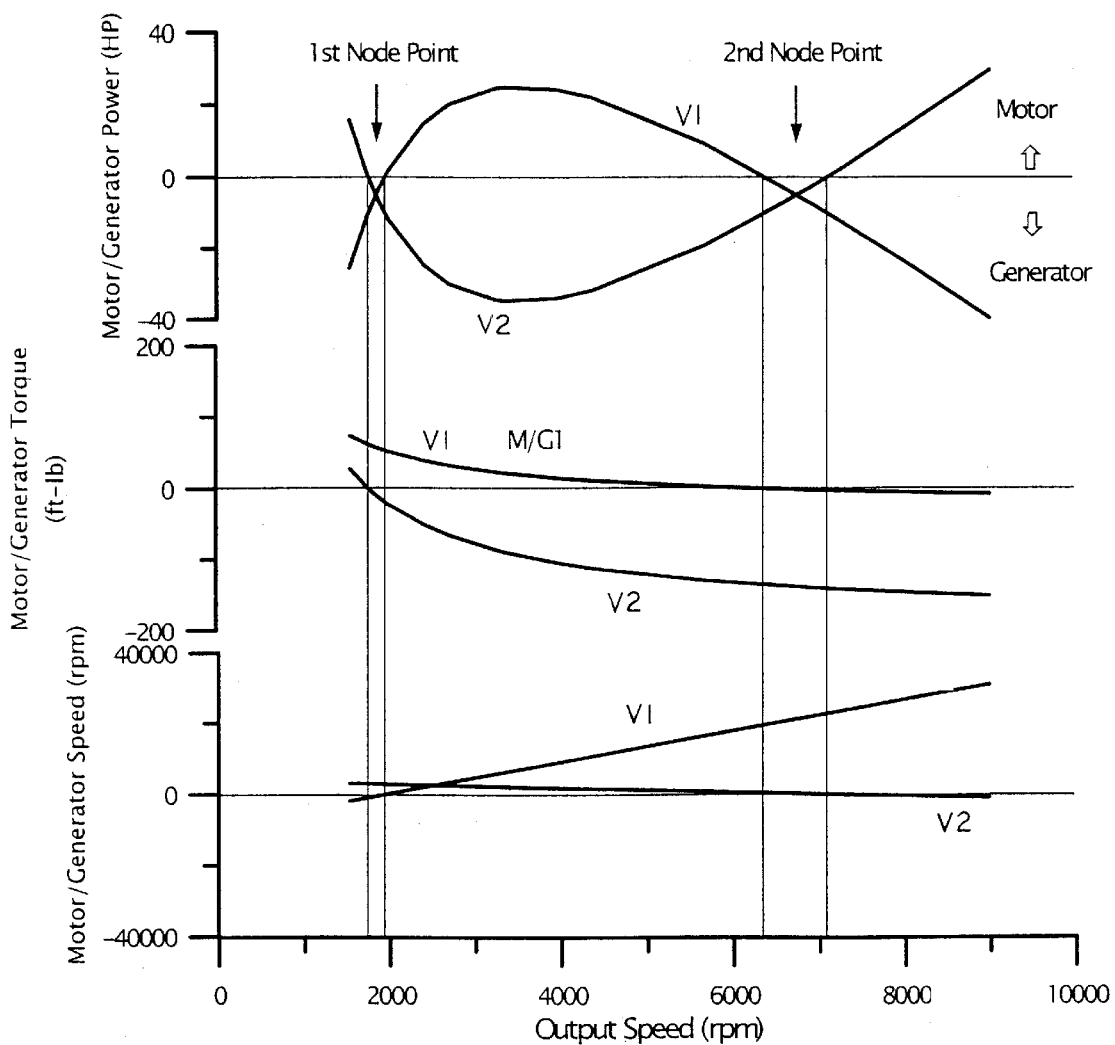
FIG. 10 is a graph comparing output speed with variator power, variator torque, and variator speed for the configuration of FIG. 4 when power is extracted at the variator path.

When power is introduced into the variator path at the control unit J, the graphical representation of the operation for the transmission of configuration I changes slightly (FIG. 9) as it does when power is extracted through the control unit J (FIG. 10). For example, the controller J may divert some of the energy supplied by the prime mover at the tubular input shaft 8 to a storage device or for other uses. Then again, the controller J may accept electrical energy from an external source, such as the storage battery, and use the power represented by that energy to supplement the power delivered to the input shaft 8 by the prime mover, in which event the output shaft 20 may deliver power greater than the power supplied by the prime mover. On the other hand, the controller J may divert the power supplied by the external source to the input shaft 8 and to the prime mover itself to start the prime mover, thus eliminating the traditional starter motor and its throw-out gear.

Figure 7:
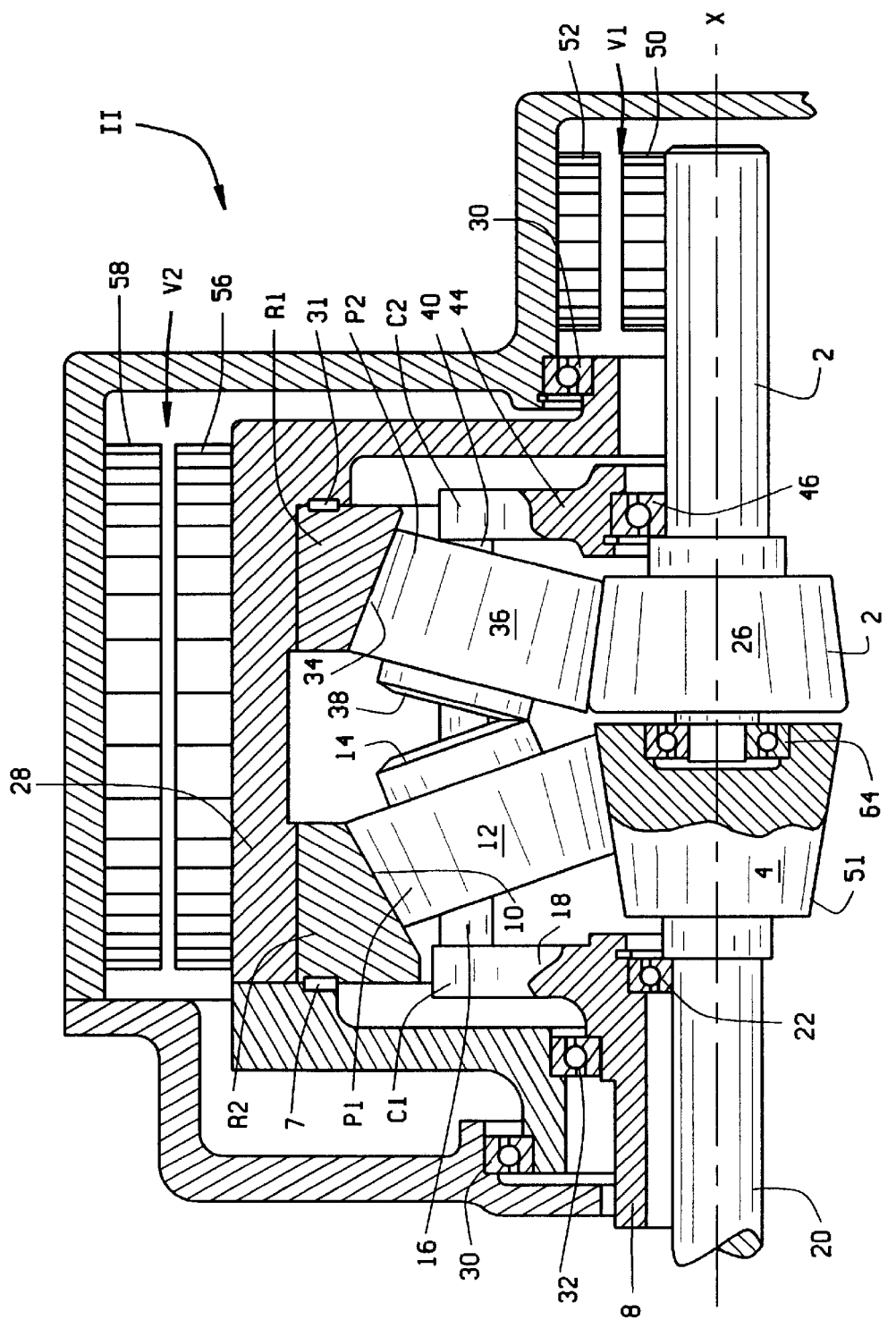
FIG. 7 is a half-sectional view in elevation of the configuration and variant illustrated schematically in FIG. 4.

The transmission in its configuration II, first variant (FIG. 4), and with tapered contacting surfaces (FIG. 7), in many respects resembles the first variant of configuration with tapered surfaces. However, the two sun members S1 and S2 are detached so that one may rotate relative to the other on a bearing 64 that is between them. While the sun member S2 of the planetary unit U2 remains on the internal center shaft 2, along with the rotor 50 for the variator V1, the sun member S1 for the planetary unit U1 is connected directly to the external center shaft 20. Instead of being connected to the external center shaft 20, the ring member R1, like the ring member R2, is fitted to the drum 28, and hence the two ring members R1 and R2 rotate together at the same velocity along with the rotor 56 for the variator V2. The contacting end faces 14 and 38 for the planetary elements P1 and P2, respectively, lie along a line that connects the intersection of the envelopes for the conical surfaces 10 and 34 and the intersection of the axes for the elements P1 and P2.

The basic geometry for the first variants of configurations I and II when contacting tapered surfaces are employed (FIGS. 6 & 7) is disclosed in U.S. patent application Ser. No. 09/627,675 of Xiaolan Ai, filed Jul. 28, 2000, now U.S. Pat. No. 6,406,399 and entitled Planetary Traction Drive Transmission.

The transmissions of the configurations I and II are relatively simple and easy to manufacture. They occupy relatively little space and are not particularly heavy. Yet they have the capacity to transfer torque and power of high magnitude. Moreover, by being capable of delivering power to or accepting power from an outside source, the transmissions at configurations I and II offer design possibilities not available with conventional transmissions. But, most importantly, despite their small size and simplicity, the transmissions of the configurations I and II offer high speed range ratio 4 when applications call for such ratios.

What is claimed is:

1. A transmission comprising: a base; first and second planetary units organized about a common axis that is fixed in position with respect to the base, with each unit including a sun member, a ring member surrounding the sun member, planet elements located between and contacting the sun and ring members, and a carrier member providing axes about which the planet elements rotate between the sun and ring members, two of the members of the first unit being joined to their corresponding members in the second unit to form sets of united members, the remaining member of the first unit being detached from the corresponding member in the second unit to provide a set of differential members that can rotate relative to each other; a first external coupler connected to one of the sets of united members; a second external coupler connected to the differential member of the first unit; a first variator mounted on the base and coupled to the other set of united members for transferring power to or extracting power from that set of united members; a second variator mounted on the base and coupled to the differential member of the second unit for transferring power to or extracting power from the differential member of the second unit.

2. A transmission according to claim 1 wherein the first and second variators are connected such that power is transferred between them.

3. A transmission according to claim 2 and further comprising a control unit connected to the first and second variators for controlling the amount of power transferred between the first and second variators.

4. A transmission according to claim 3 wherein each variator is an electric motor-generator.

5. A transmission according to claim 1 wherein the carrier members of the first and second units are joined together and the first external coupler is connected to the joined together carrier members.

6. A transmission according to claim 5 wherein the ring members of the first and second sets are detached.

7. A transmission according to claim 5 wherein the sun members of the first and second sets are detached.

8. A transmission according to claim 1 wherein the sun member, the ring member and the planet elements of each planetary unit have contacting surfaces which are tapered.

9. A transmission according to claim 8 wherein the planet elements have end faces and the planet elements of first unit contact the planet elements of the second unit and vice versa at the end faces of such planet elements.

10. A transmission according to claim 9 wherein the tapered surfaces on the sun members of the first and second units taper downwardly away from each other and the planetary elements are on apex.

11. A transmission comprising: a housing, first and second planetary units organized about a common axis that is fixed in position with respect to the housing, each unit including a sun member, a ring member located around the sun member, planet elements located between and contacting the sun and ring members, and a carrier member providing axes around which the planet elements rotate, the sun members of the first and second units being joined together and the carrier members of the first and second units being joined together, but the ring members of the first and second units being detached so that the ring members can rotate relative to each other; a first external shaft connected to the ring member of the first unit; a second external shaft connected to one of the joined together members of the first and second units; a first variator in the form of an electrical motor-generator having a stator mounted in a fixed position with respect to the housing and a rotor mounted in a fixed position with respect to the other joined together members; a second variator in the form of an electrical motor-generator having a stator mounted in a fixed position with respect to the housing and a rotor mounted in a fixed position with respect to the ring member of the second unit; and a control unit connected to the first and second variators to control power transferred between the variators.

12. A transmission according to claim 11 wherein the second external shaft is connected to the joined together carrier members and the rotor of the first variator is mounted in a fixed position with respect to joined together sun members.

13. A transmission according to claim 11 wherein the second external shaft is connected to the joined together sun members and the rotor of the first variator is mounted in a fixed position with respect to the joined together carrier members.

14. A transmission according to claim 12 wherein the joined together sun members are mounted on an internal shaft and the rotor of the first variator is on the internal shaft.

15. A transmission comprising: a housing; first and second planetary units organized about a common axis that is fixed in position with respect to the housing, each unit including a sun member, a ring member located around the sun member, planet elements located between and contacting the sun and ring members, and a carrier member providing axes around which the planet elements rotate, the ring members of the first and second units being joined together and the carrier members of the first and second units being joined together, but the sun members of the first and second units being detached so that the sun members can rotate relative to each other; a first external shaft connected to one of the joined together members of the first and second units; a second external shaft connected to the sun member of the first unit; a first variator in the form of an electrical motor-generator having a stator mounted in a fixed position with respect to the housing and a rotor mounted in a fixed position with respect to the sun member of the second unit; a second variator in the form of an electrical motor-generator having a stator mounted in a fixed position with respect to the housing and a rotor mounted in a fixed position with respect to the other joined together members; and a control unit connected to the first and second variators to control power transferred between the variators.

16. A transmission according to claim 15 wherein the first external shaft is connected to the joined together carrier members and the rotor of the second variator is mounted in a fixed position with respect to the joined together ring members.

17. A transmission according to claim 15 wherein the first external shaft is connected to the joined together ring members and the rotor of the second variator is mounted in a fixed position with respect to the joined together carrier members.

18. A transmission according to claim 1 characterized by a nominal speed range ratio $\phi$ that is $$\phi = \frac{C}{K1 - K2}$$

where
  C is a constant
  K1 is the speed ratio for the first planetary unit, and
  K2 is the speed ratio for the second planetary unit.

19. A transmission according to claim 11 characterized by a nominal speed range ratio $\phi$ that is $$\phi = \frac{K1 + 1}{K1 - K2}$$

where
  K1 is the speed ratio for the first planetary unit, and
  K2 is the speed ratio for the second planetary unit.

20. A transmission according to claim 15 characterized by a nominal speed range ratio $\phi$ that is $$\phi = \frac{K1(K2 + 1)}{K1 - K2}$$

where
  K1 is the speed ratio for the first planetary unit, and
  K2 is the speed ratio for the second planetary unit.

21. A transmission comprising: first and second planetary units organized about a common axis, with each unit including a sun member, a ring member surrounding the sun member, planetary elements located between and contacting the ring and sun members, and a carrier member providing axes about which the planet elements rotate; external couplers connected to members of the units, the units themselves being coupled to provide a planetary path between the external couplers, with the planetary path being characterized by purely mechanical transfer of power; a first variator located on one of the members and a second variator, located on another of the members, the variators being connected so as to, along with at least some of the other members, provide a variator path between the external couplers, with the variator path being characterized by the ability to vary speed and torque to the members that are coupled through the variators; the transmission having two node points that represent speeds at which no power is transferred through the variator path in absence of the introduction of power into or the extraction of power from the transmission at its variator path; and wherein in the absence of the introduction into or the extraction of power from the variator path, the maximum power $P_{variator}$ that passes through the variator path when the transmission operates at speeds between its node points is $$P_{variator} = \frac{\sqrt{\phi} - 1}{\sqrt{\phi} + 1} P$$

where
  P is the power supplied to the transmission at one of its external couplers, and
  $\phi$ is the nominal speed range ratio for the transmission.

* * * * *